United States Patent
Ripingill, Jr. et al.

(10) Patent No.: US 6,720,921 B2
(45) Date of Patent: Apr. 13, 2004

(54) POSITION LOCATION AND TRACKING METHOD AND SYSTEM EMPLOYING LOW FREQUENCY RADIO SIGNAL PROCESSING

(76) Inventors: Allen E. Ripingill, Jr., 18990-41 Caminito Cantilena, San Diego, CA (US) 92128; David A. Robinson, 15625 Caldas De Reyes, San Diego, CA (US) 92128

( * ) Notice: Subject to any disclaimer, the term of this patent is extended or adjusted under 35 U.S.C. 154(b) by 47 days.

(21) Appl. No.: 10/077,326

(22) Filed: Feb. 15, 2002

(65) Prior Publication Data

US 2003/0156062 A1 Aug. 21, 2003

(51) Int. Cl.$^7$ ................................................ G01S 3/02
(52) U.S. Cl. ...................................... 342/464; 342/448
(58) Field of Search ............................... 342/448, 452, 342/457, 463, 464; 455/456, 457

(56) References Cited

U.S. PATENT DOCUMENTS

| | | | | |
|---|---|---|---|---|
| 4,688,037 A | * | 8/1987 | Krieg | 340/825.72 |
| 5,307,072 A | * | 4/1994 | Jones | 342/147 |
| 5,600,330 A | * | 2/1997 | Blood | 342/463 |
| 6,337,627 B1 | * | 1/2002 | Von Gutfeld et al. | 340/572.1 |
| 6,496,008 B1 | * | 12/2002 | Brune et al. | 324/326 |
| 2002/0165448 A1 | * | 11/2002 | Ben-Haim et al. | 600/424 |

OTHER PUBLICATIONS

Prigge, Eric "An Indoor Absolute Positioning System with No Line of Sight Restrictions and Building–Wide Coverage," Aerospace Robotics Laboratory, Stanford University, Dec. 9, 2001; Research Advisor; Prof. J.P. How, SSL, MIT.

Orr, John A. & Cyganski, David "Developing a System for Tracking and Locating Personnel in Hostile Environments" Electrical & Computer Engineering Dept., Worcester Polytechnic Institute, Worcester, MA 01609, e–mail: orr@wpi.edu.

* cited by examiner

Primary Examiner—Dao Phan (57) ABSTRACT

A position location system adapted for Military Operations in Urbanized Terrain (MOUT) training exercises that equips a player with a magnetic sensor for detecting a low frequency (LF) magnetic field from a plurality of stationary antennas. The distance between the player-borne sensor and a stationary antenna is proportional to the logarithm of the magnetic field intensity because the player remains within the "near field" of the stationary antenna. With scheduled transmissions from six stationary antennas, the position and angular orientation of a player bearing a three-axis magnetic field sensor may be resolved in three-dimensions to within one foot (30 cm). The LF magnetic field intensity is generally unaffected by structural obstructions or multipath distortion. The stationary antennas and transmitters may be permanently installed at little expense in any urban structure so that sensor-equipped emergency workers may be located and tracked within the structure during emergency fire and rescue operations.

19 Claims, 7 Drawing Sheets

POSITION LOCATION AND TRACKING METHOD AND SYSTEM EMPLOYING LOW FREQUENCY RADIO SIGNAL PROCESSING

BACKGROUND OF THE INVENTION

1. Field of the Invention

This invention relates generally to a personnel position location and tracking system and more particularly to an in-structure three-dimensional high-accuracy position monitoring system employing low frequency radio waves.

2. Description of the Related Art

The United States Army places high importance on training for urban warfare such as Military Operations in Urbanized Terrain (MOUT). Interest in training technology for MOUT has matured over the past decade because of the accumulation of experiences in Somalia, Serbia and Afghanistan. Based on evaluations by the United States Army and other military forces, specifications were promulgated for MOUT combat training systems that include means for locating and tracking trainees ("players") inside buildings and tunnels during simulated MOUT combat exercises. With experience, it was found that location accuracy to within one meter and tracking updating within one second satisfied the MOUT training requirements both inside and outside of structures.

The Global Positioning System (GPS) is a widely-used and very useful system for position location and tracking but the GPS relies on high-frequency radio signals from orbiting satellites that cannot penetrate structures generally. Moreover, the five meter location accuracy of the GPS is not entirely sufficient for MOUT training purposes. Alternative position tracking technologies known in the art are also generally unable to deliver the performance features required for MOUT training exercises inside structures such as rooms, tunnels and bunkers. These include ultrasonic echo-location, inertial navigation systems (INS), position sensor grids, radio frequency (VHF/UF) echo-location, and passive/active infrared (IR) detection.

Generally, these prior art systems monitor the location of a trainee or "player" by measuring the time-of-arrival (TOA) of energy transferred between the player and a plurality of synchronized emitters in the room. The player position is computed by simple trilateration using the TOA data, the propagation velocity of the energy, and the known emitter locations. Moreover, each emitter must be uniquely identified by some signal characteristic. For example, ultrasonic energy propagates at about one foot per millisecond through air at sea level and radio frequency (RF) energy propagates through the same medium at about one foot per nanosecond. Because TOA measurements made in milliseconds are inherently simpler and more precise than those made in nanoseconds, ultrasonic trilateration is simpler and cheaper than RF trilateration, for example. Of course, these prior art systems may also monitor the TOA of energy emitted by the player at a plurality of sensors stationed about the room to similar effect, relying on the reciprocity principle.

Another approach known in the art is to instrument the training facility or "room" with a grid of uniquely-coded sensors spaced appropriately for the required positioning precision. Player position is monitored directly by signaling with the sensor most proximate the player. Energy broadcasts, mechanical pressure, local capacitance or any other well-known and useful method may be used to trigger the proximate sensor. Disadvantageously, such a system requires the pre-installation of a large plurality of sensors (versus a few for the TOA approach) and the accurate resolution of player positions in three dimensions may impose excessive complexity on the system.

Using such systems requires regular recomputation of the player position. This may occur at the player or at the sensor/emitter stations. Ideally, computation load is places at the sensor/emitter stations to minimize the electronic power consumption aboard the trainee player. Substantial power and signal wiring may be required to interconnect all sensor/emitter stations and any related processing systems.

The INS is well-known for aircraft and missile guidance systems. The typical INS employs a gyroscope and accelerometers oriented to detect acceleration in three dimensions. Position translation may be computed by integrating the accelerations over time. Drift of INS position may be reset using the GPS when available but otherwise, position error from drift is a major disadvantage of the INS.

Table 1 compares the performance features of these prior art systems in conditions expected during MOUT training exercises:

TABLE 1

| | Prior Art Position Monitoring Technology | | | | | |
|---|---|---|---|---|---|---|
| Performance Feature | Ultrasound | Sensor Grid | VHF | UHF | Infrared | Inertial |
| Freq (MHz) | 0.05 | N/A | 900 | 30,000 | $10^{10}$ | N/A |
| Wavelength (cm) | 0.7 | N/A | 33 | 1 | 0.0001 | N/A |
| Accuracy | Excellent | Depends | Good | Good | Good | Fair |
| Stability | Fair | Excellent | Excellent | Excellent | Excellent | Poor |
| Measures Orientation? | No | No | No | No | No | Depends |
| Position Resolved at? | Either | Building | Either | Either | Either | Player |
| Multipath Resistance | Excellent | Robust | Poor | Fair | Good | Robust |
| Room Ambiguity Resistance | Poor | Robust | Poor | Fair | Good | Good |
| Gunfire/Noise Resistance | Poor | Depends | Excellent | Excellent | Excellent | Fair |
| Smoke/Fog Resistance | Good | Depends | Excellent | Excellent | Poor | Excellent |
| Resistance to Obstructions | Fair | Depends | Fair | Poor | Poor | Excellent |
| Thermal Imager Compatibility | Excellent | Depends | Excellent | Excellent | Poor | Excellent |
| Live Fire Damage Resistance | Poor | Poor | Poor | Poor | Poor | Excellent |
| Player Unit Complexity/Cost | Low | Low | High | High | Moderate | Very High |
| Building Site Complexity/Cost | High | Very High | High | High | Moderate | Low |

Close examination of Table 1 demonstrates that none of the prior art technologies offers the performance features necessary for MOUT training exercises with reasonable complexity and cost. For example, the ultrasound techniques known in the art are vulnerable to inaccuracies arising from multipath interference, building obstructions and weapons noise and do not detect orientation in three-dimensions. The UHF and VHF systems are generally quite expensive and robust but their performance is vulnerable to obstructions and room ambiguity. The INS is generally robust but is very expensive and has poor stability from long term drift, for example.

There is still a strong need in the art for a player locator system adapted for MOUT training exercises that can provide the necessary performance features with reasonable complexity and cost. There is also a need for such a system for use in tracking the positions of emergency workers during fire and rescue operations in an urban structure, where conditions may be similar to those expected during MOUT training exercises. The related unresolved problems and deficiencies are clearly felt in the art and are solved by this invention in the manner described below.

SUMMARY OF THE INVENTION

This invention solves the above described problems by introducing for the first time a position location system that relies on detection by a magnetic sensor of a low frequency (LF) magnetic field from a plurality of stationary antennas. The distance between a stationary antenna and the player-borne sensor is proportional to the logarithm of the magnetic field intensity because the player remains within the "near field" of the stationary antenna. With scheduled transmissions from six stationary antennas, the position of a player equipped with a three-axis magnetic sensor may be resolved in three-dimensions to within one foot (30 cm). Player orientation (angular position) may also be resolved in three dimensions. The LF magnetic field intensity is generally unaffected by structural obstructions, multipath distortion or any of the other performance-degrading problems discussed above in connection with Table 1.

It is a purpose of this invention to provide a player locator system adapted for MOUT training exercises that can provide the necessary performance features with reasonable complexity and cost. The performance features of this invention are summarized in Table 2:

TABLE 2

| Performance Feature | LF System of This Invention |
| --- | --- |
| Freq (MHz) | 0.1 |
| Wavelength (cm) | 300,000 |
| Accuracy | Excellent |
| Stability | Excellent |
| Measures Orientation? | Yes |
| Position Resolved at? | Building or Player |
| Multipath Resistance | Excellent |
| Room Ambiguity Resistance | Excellent |
| Gunfire/Noise Resistance | Excellent |
| Smoke/Fog Resistance | Excellent |
| Resistance to Obstructions | Excellent |
| Thermal Imager Compatibility | Excellent |
| Live Fire Damage Resistance | Good |
| Player Unit Complexity/Cost | Low |
| Building Site Complexity/Cost | Low |

It is another purpose of this invention to provide a position location and tracking system adaptable for use in tracking the positions of emergency workers during fire and rescue operations in an urban structure, where conditions may be similar to those expected during MOUT training exercises. It is an advantage of the system of this invention that the stationary antennas and transmitters may be permanently installed at little expense in any urban structure so that sensor-equipped emergency workers may be located and tracked within the structure during emergency fire and rescue operations.

In one aspect, he invention is a method for reporting the position of a player unit in a position locator system including a controller and one or more instrumented zones each bounded by two antennas on two generally opposite sides, including the steps of radiating a first magnetic signal from the antenna on a first side of a first instrumented zone, receiving the first magnetic signal at the player unit and generating a first sensor signal representing the first magnetic signal received at the player unit; radiating a second magnetic signal from the antenna on a second side of the first instrumented zone generally opposite the first side thereof, receiving the second magnetic signal at the player unit and generating a second sensor signal representing the second magnetic signal received at the player unit; broadcasting a player position data signal corresponding to a combination of all of the sensor signals and receiving the player position data signal at the controller.

In an exemplary embodiment, the invention is a position locator system including one or more instrumented zones, a plurality of antennas each having an orientation axis and a predetermined location on the periphery of at least one of the instrumented zones, a transmitter coupled to each antenna for producing therein a signal current, whereby a magnetic signal is radiated therefrom, and one or more player units each having a field sensor for producing a sensor signal representing the magnetic signals radiating from the antennas and a signal processor for generating player position data responsive to the sensor signal.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
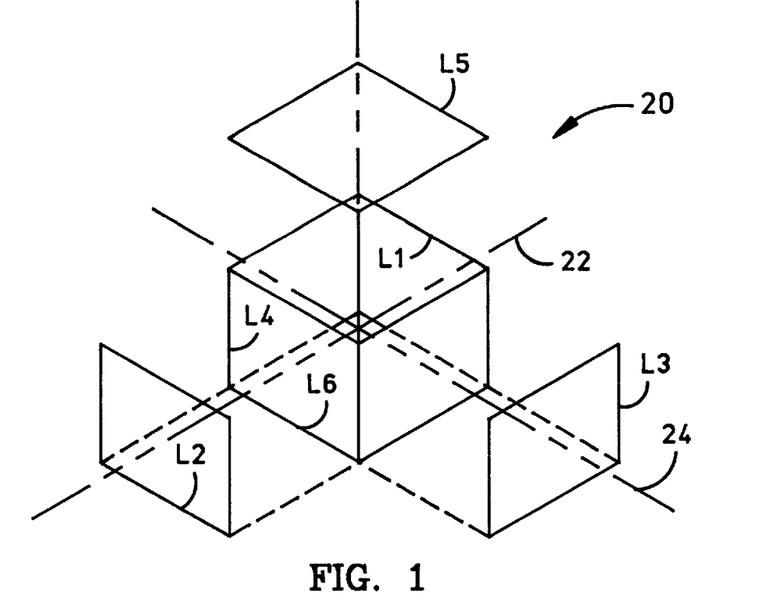
FIG. 1 illustrates a perspective view of an instrumented zone of this invention as defined by the disposition of several antennas on the periphery of the instrumented zone.

The position location and tracking system of this invention provides the means for monitoring the location of a player unit to within one foot in three dimensions within an instrumented zone such as the instrumented zone 20 shown in FIG. 1. Instrumented zone 20 is defined by the three pairs of loop antennas L1/L2, L3/L4 and L5/L6 disposed at the periphery thereof. Each loop antenna is disposed symmetrically about an orientation axis exemplified by the orientation axis 22 of antennas L1/L2 and the orientation axis 24 of antennas L3/L4. Each loop antenna pair is disposed with one element on opposite sides of instrumented zone 20 with the corresponding orientation axis orthogonal to the orientation axes of the other two loop antenna pairs, substantially as shown. Thus, loop antennas L1 defines a first edge of instrumented zone 20 and loop antennas L1 defines a second edge substantially opposite the first edge. Loop antenna pair L3/L4 define another two edges substantially orthogonal to the first and second edges defined by loop antenna pair L1/L2. The loop antennas may each consist of a simple loop of conductive wire suitable for carrying an electrical current at any operating frequency in the low frequency (LF) region from 50–500 kHz, for example, and may be disposed about a loop diameter of 0.001 wavelengths at the operating frequency, for example.

Conventional radio systems use the radiated electromagnetic field, which is observed only at some distance from the antenna, and is therefore denominated the far field. Closer to the antenna, the so-called near field includes the electric electrostatic field and the magnetic induction field. Unlike the radiated field, which can be transmitted for some considerable distance, the induction field decays with the cube of distance and is therefore a very local phenomenon. However the induction field may be generated using a relatively small antenna. Because the operating wavelength of each loop antenna L1–L6 is several orders of magnitude larger than any dimension of instrumented zone 20, all points within instrumented zone 20 are well within the near field of each loop antenna L1–L6. This means that the magnetic field radiated from each loop antenna L1–L6 varies in magnitude according to a predictable inverse cube law with distance. Waveguide and multipath effects are negligible in the near field. Moreover, any metal objects or structures within instrumented zone 20 are so small in terms of wavelength that they do not appreciably affect the magnetic field strength radiated by any of loop antennas L1–L6 except at the surface of the metal. Each loop antenna L1–L6 may be expanded to instrument a multistory building without materially changing the near-field characteristics in the LF frequency band.

Figure 2:
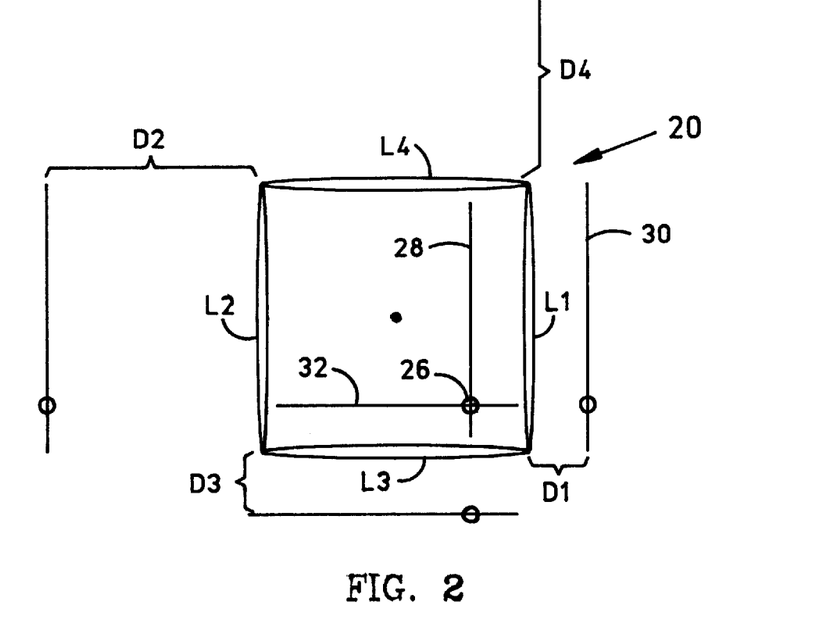
FIG. 2 illustrates a two-dimensional view of the ambiguity resolution feature of this invention in the instrumented zone of FIG. 1.

Each loop antenna L1–L6 in instrumented zone 20 is pulsed according to a predetermined LF time-division multiple access (TDMA) schedule so that only one loop antenna is transmitting at any one instant. For example, a single pulse may include one or more cycles of current at the loop antenna operating frequency. One of many useful ways to schedule the six loop antennas L1–L6 is to alternate in numerical sequence from L1 to L2 to L3 to L4 to L5 to L6 and finally back to L1 again to repeat the LF TDMA scheduling cycle. Referring to FIG. 2, when loop antenna L1 is pulsed, a player unit 26 detects the resulting magnetic field and determines a distance from loop antenna L1 related to the strength of the magnetic field detected at the operating frequency. This distance D1 is ambiguous because it does not locate player unit 26 on a particular side of loop antenna L1. Based on distance D1 alone, player unit 26 may be located anywhere along the interior line 28 or the exterior line 30 (FIG. 2). After loop antenna L1 stops transmitting, loop antenna L2 may then transmit a pulse, which is detected at player unit 26 and interpreted as a distance D2 based on the magnetic field strength at the operating frequency. This distance D2 may be combined with distance D1 derived from the earlier L1 pulse to refine the location of interior line 28, removing the ambiguity and canceling a portion of any errors in the two measurements. This illustrates the position monitoring performance of pulses from any single loop antenna pair such as loop antennas L1/L2. Each additional loop antenna pair L3/L4 and/or L5/L6 may be similarly pulsed on a LF TDMA schedule to resolve another (orthogonal) interior line on which player unit 26 is located. For example, pulsing loop antenna L3 provides a measure of the distance D3 and pulsing loop antenna L4 provides a measure of the distance D4, thereby resolving the interior line 32. The intersection of lines 32 and 28 provide the location of player unit 26 in two dimensions. If desired, the third loop antenna pair L5/L6 may then be pulsed to resolve a third interior line (perpendicular to the page) at player unit 26. Any separation of the intersections of the three lines may be allocated to cancel additional detection errors, thereby refining the accuracy of the detected location. If instrumented zone 20 encompasses a multistory building, the location of player unit 26 may be compared to blueprint data to identify the location in terms of a floor and a room, for example.

Figure 3:
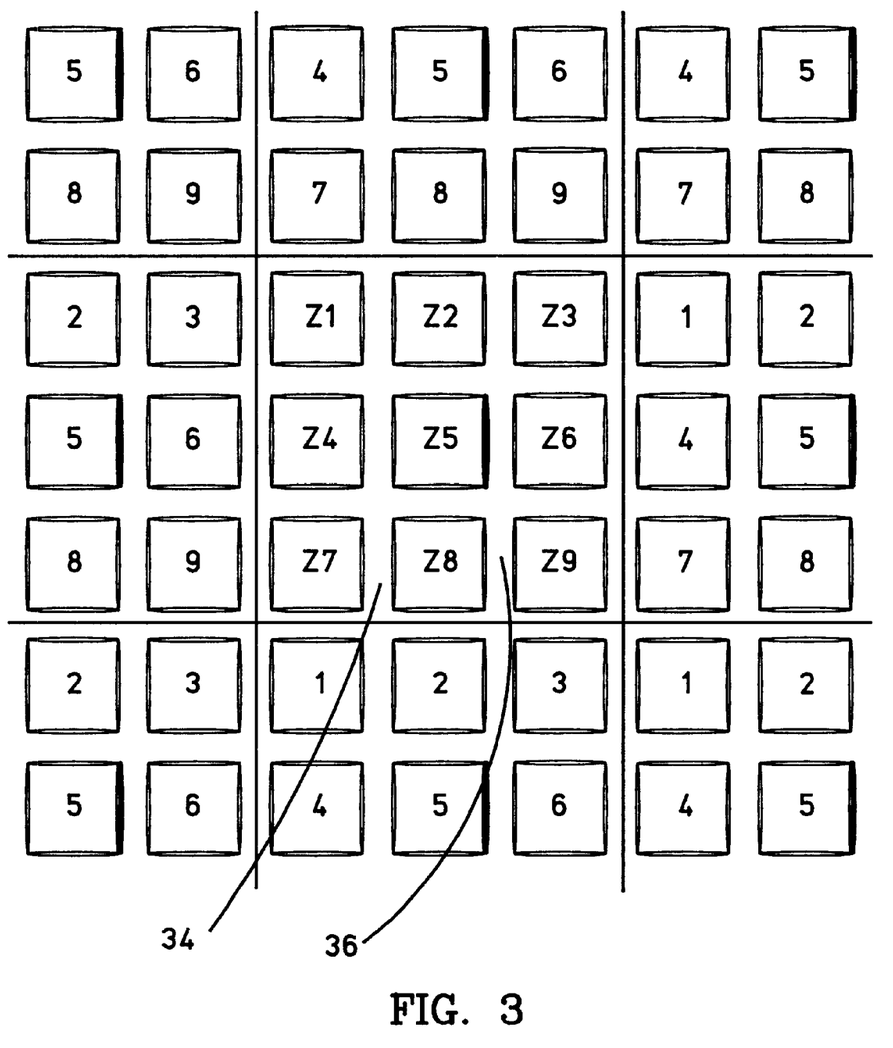
FIG. 3 illustrates a two-dimensional view of the relationships among a plurality of instrumented zones organized into several instrumented regions in accordance with this invention.

In extensive MOUT training scenarios or in complexes of very large multistory buildings, the system of this invention may be configured as a plurality of instrumented zones making up one or more "regions" such as shown in FIG. 3. Each region, exemplified by the region 34, encompasses a fixed number (for example, nine) of instrumented zones, exemplified by the instrumented zones Z1 through Z9. A LF TDMA schedule may be established for each of the 54 individual loop antennas within region 34 so that no two loop antennas are transmitting simultaneously. This eliminates interference throughout the entire system because there is always a separation of two to three zones between any two transmitting loop antennas, which substantially attenuates the neighboring magnetic field signal. For example, when the loop antenna L1 is pulsed in the instrumented zone Z5, there is a three-zone attenuation of the magnetic field radiated by any active neighboring loop antenna, which introduces negligible amplitude error at the player unit.

In FIG. 3, a position between two adjacent instrumented zones, such as the position 36 between zones Z8 and Z9, may be determined during the ambiguity resolution interval when the second loop antenna within a loop antenna pair resolves the distance ambiguity to the exterior line instead of the interior line discussed above in connection with FIG. 2. This capability permits player position monitoring in the streets between buildings, for example.

Figure 4:
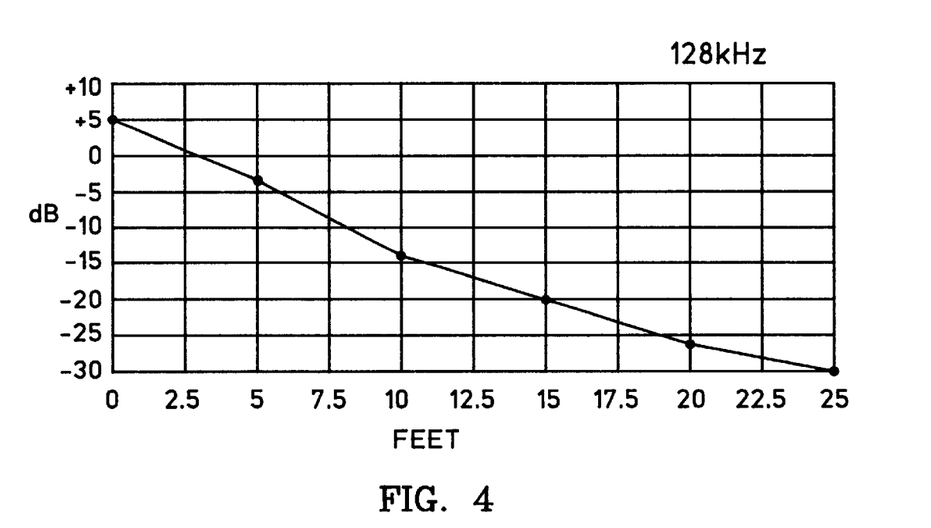
FIG. 4 illustrates the root-mean-square (RMS) magnetic field signal strength in decibels (dB) as a function of orthogonal distance in feet from the center of a ten-foot loop antenna in which a 128 kHz sinusoidal current is flowing.
Figure 5:
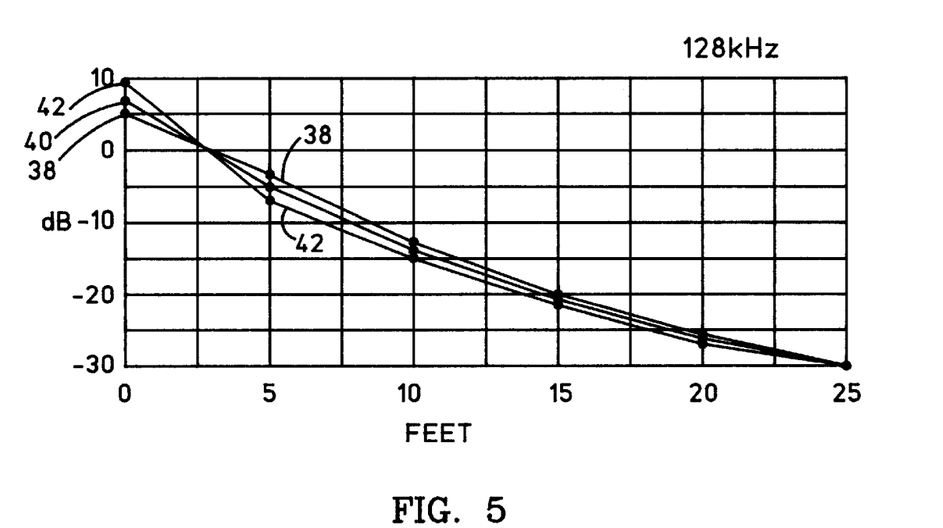
FIG. 5 illustrates several variations in root-mean-square (RMS) magnetic field signal strength in decibels (dB) as a function of orthogonal distance in feet from the antenna of FIG. 4.

FIG. 4 illustrates the root-mean-square (RMS) magnetic field signal strength in decibels (dB) as a function of orthogonal distance in feet from the center of a ten-foot loop antenna in which a 128 kHZ sinusoidal current is flowing. The variation is nearly linear in decibels (dB), which suggests that, for example, a simple logarithmic amplifier may be used as an analog signal processor to generate a player position signal representing the logarithm of the magnetic field intensity. Such a player position signal would vary generally linearly with distance from the transmitting loop antenna and any second-order nonlinearity may be calibrated as a compensation in a microprocessor look-up table, for example. FIG. 5 illustrates the disadvantageous variations in magnetic field strength as the player position approaches the edges of the loop antennas, which may introduce inaccuracies within several feet of the loop antenna. The chart line 38 shows the root-mean-square (RMS) magnetic field signal strength in decibels (dB) as a function of orthogonal distance in feet from the center of the loop antenna. The chart line 40 shows the same variable measured orthogonally with a point midway between the center and the edge of the loop antenna. The chart line 42 shows the same variable measured orthogonally to a point midway between the point of line 40 and the edge of the loop antenna. Most of the variation occurs within the first several feet of the loop antenna and may be compensated out by comparing the results from the opposing antenna in the loop antenna pair.

Figure 6:
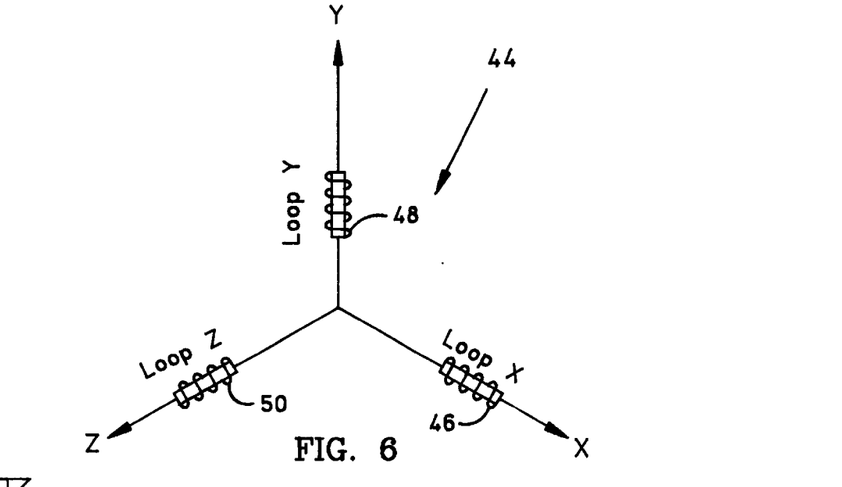
FIG. 6 illustrates an exemplary embodiment of a three-axis magnetic field sensor suitable for use in the system of this invention.

FIG. 6 shows a three-axis magnetic field sensor 44 including a sensor element 46 oriented along an X-axis, a sensor element 48 oriented along a Y-axis, and a sensor element 50 oriented along a Z-axis such that the orientations of sensor elements 46–50 are mutually orthogonal. By using the three mutually-orthogonal sensor elements 46–50 with each coupled to a separate log amplifier (FIG. 7), the orientation of the player unit (additional to the position) may be resolved in three dimensions.

Figure 7:
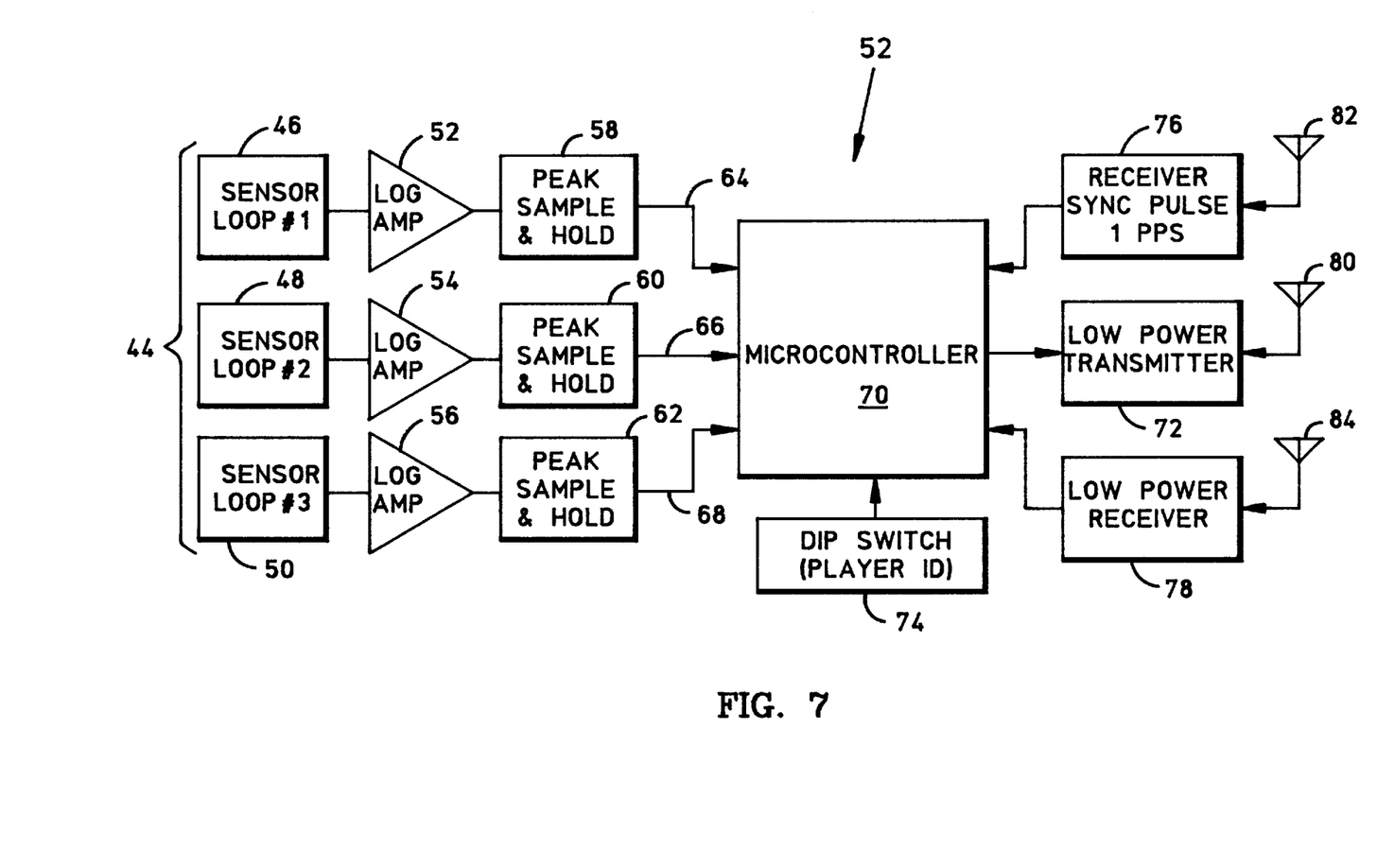
FIG. 7 is a functional block diagram illustrating the player unit of this invention.

FIG. 7 shows an exemplary embodiment of the player unit 52 of this invention including three-axis magnetic sensor 44 from FIG. 6. Each sensor element 46, 48 and 50 is coupled to a separate log amplifier 52, 54 and 56. Each log amplifier 52–56 is coupled to a separate peak sample-and-hold (SH) circuit 58, 60 and 62, respectively. SH circuits 58≧62 operate to capture the peak value of the logarithm of the magnetic field amplitude from a corresponding one of sensor elements 46–50, and produce a separate sensor signal 64, 66 and 68, respectively. The algebraic sum of sensor signals 64–68 represents the total magnetic field amplitude and hence the distance from the active loop antenna. The relative amplitudes of sensor signals 64–68 each represent a trigonometric function of the orientation angle of the sensor with respect to the active loop antenna. The player microcontroller 70 accepts the fixed analog sensor signals 64–68, converts them to digital data, and saves them as player position data in a local memory. This sampling and saving process recycles on the LF TDMA schedule (FIG. 9) so that player position data are produced and saved for every loop antenna pulse scheduled in the system. Microcontroller 70 may also include some look-up table means for adjusting sensor signals 64–68 to compensate for magnetic field variations in certain portions of instrumented zone 20, for example.

Once player unit 52 has recorded player location data for each of the loop antennas in a LF TDMA schedule, the player position data must be processed to derive player position and orientation. This more demanding data processing is preferably performed in the stationary system elements having access to fixed electric power and computing hardware. So player position data must be regularly transmitted from player unit 52 to a local zone microcontroller (FIG. 8) and from there to a central controller, where they may be processed and displayed centrally together with position location data from other player units engaged in the system. This is accomplished with the low-power data transmitter 72 (FIG. 7), which broadcasts a high-frequency (HF) radio signal (400 MHz, for example) containing player position data from player microcontroller 70 according to a HF TDMA schedule managed by a central controller. Microcontroller 70 also broadcasts player unit identification (ID) data established by means of the DIP switch 74. As soon as player unit 52 enters an instrumented zone, position location system transmissions are detected at the synch pulse receiver 76 and the low-power receiver 78. Because both LF and HF TDMA schedules (FIG. 9) are managed externally, player unit 52 must immediately request a HF TDMA slot in which to transmit player position data. Low-power receiver 78 is provided to accept this HF TDMA schedule information and other communications from the instrumented zone. Synch pulse receiver 76 is provided to inform player microcontroller 70 of the beginning of each TDMA interval. This synchronizes the storage of player position data from sensor signals 64–68 and the player position data broadcasts in the appropriate HF TDMA intervals. Low-power data transmitter 72, synch pulse receiver 76 and low-power receiver 78 each are coupled to an antenna 80, 82 and 84, respectively.

Figure 8:
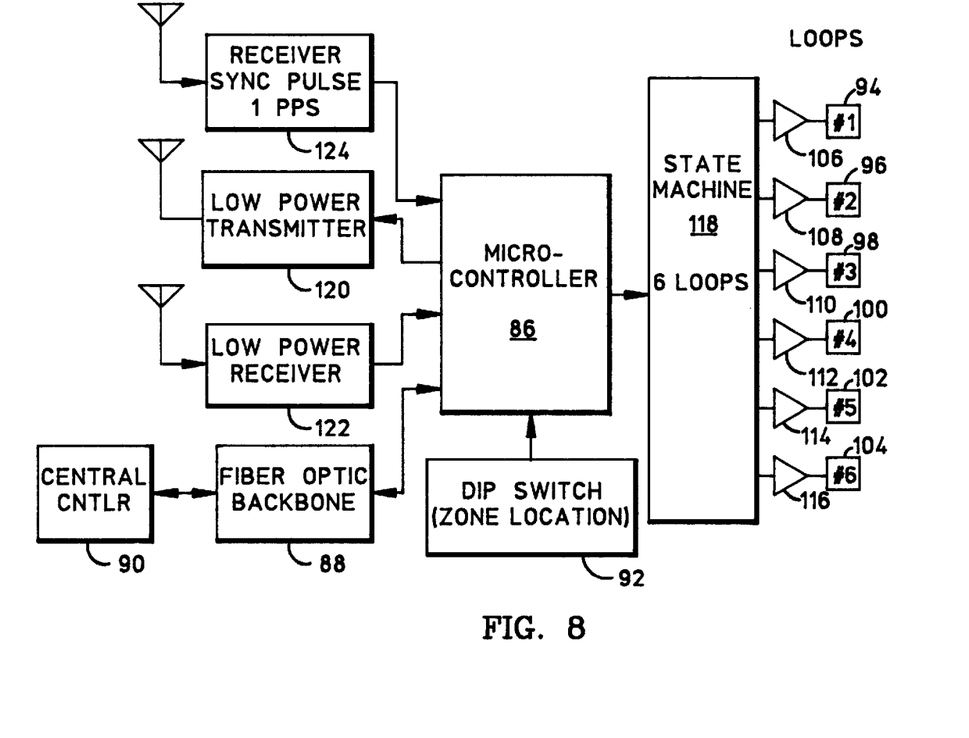
FIG. 8 is a functional block diagram illustrating the stationery position locator system elements of this invention.

FIG. 8 shows a stationery instrumented zone transmitter assembly that includes a zone microcontroller 86 coupled to a fiber optic backbone 88 with which data may be exchanged with the central controller 90. Central controller 90 may be coupled to a number of instrumented zones (see FIG. 3, for example) and manages the LF and HF TDMA scheduling for all loop antenna pulsing and player position data broadcasts as described below in connection with FIG. 9. In FIG. 8, a DIP switch 92 is provided to impose a zone ID code on zone microcontroller 86, which is needed to synchronize the operation of the loop antennas 94, 96, 98, 100, 102 and 104 with all other instrumented zones in the region. Central controller 90 assigns TDMA operating intervals based on the instrumented zone ID code, which varies from zone to zone within a region (FIG. 3). Each loop antenna 94–104 is powered by a transmitter 106, 108, 110, 112, 114 and 116, respectively. The state machine 118 provides the requisite synchronization of transmitters 106–116 under the control of zone microcontroller 86. The low-power transmitter 120 and the low-power receiver 122 are provided to communicate with the corresponding low-power data transmitter 72 and low-power receiver 78 in player unit 52 (FIG. 7). The synch pulse receiver 124 is provided to inform zone microcontroller 86 of the beginning of each TDMA interval. Player position data broadcasts from low-power data transmitter 72 (FIG. 7) are received by low-power receiver 122 and transmitted directly to zone microcontroller 86, where the data are time-stamped and forwarded to fiber optic backbone 88, from which the player position data are received at central controller 90 for analysis.

Figure 9:
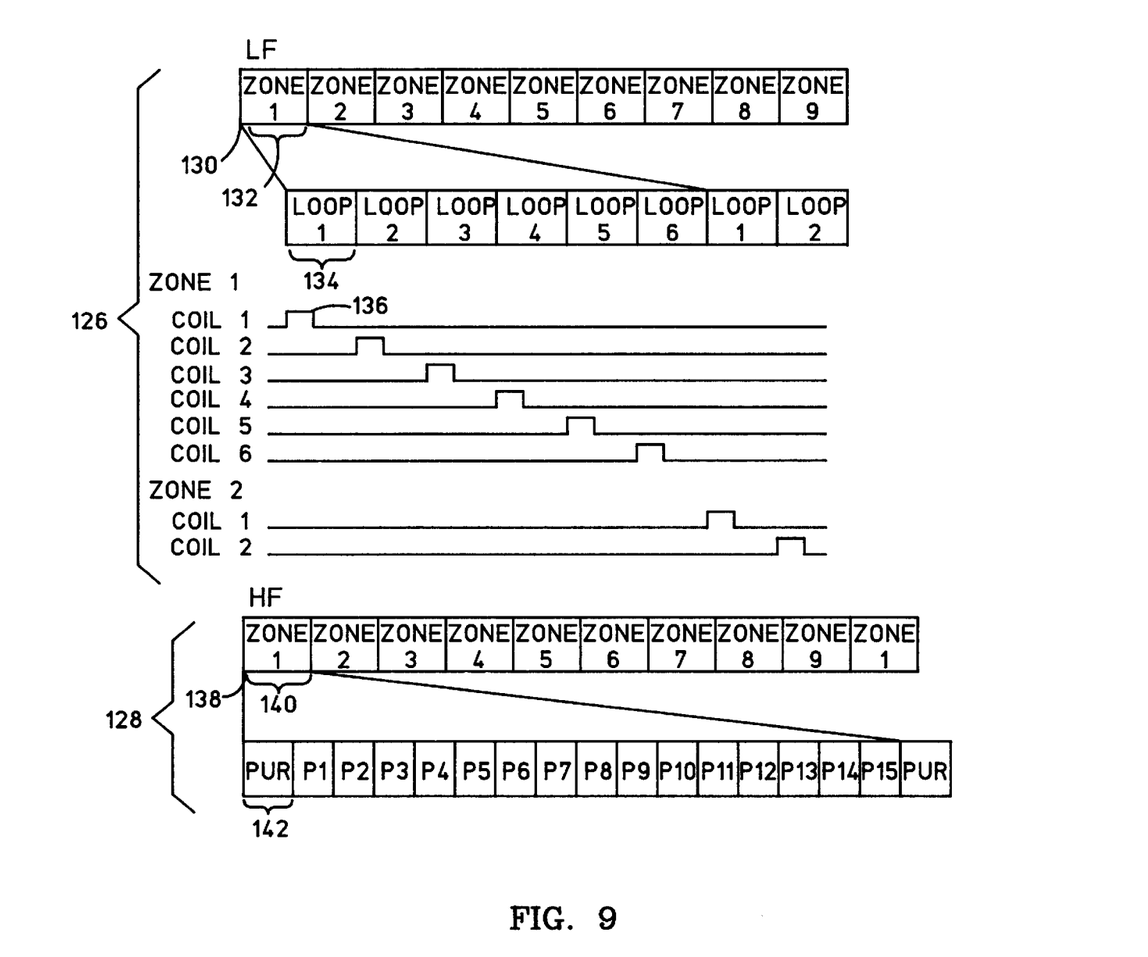
FIG. 9 is a waveform diagram illustrating the TDMA schedules of this invention.

FIG. 9 is a waveform diagram illustrating the operation of the LF and HF TDMA schedules. Two TDMA schedules are required; the LF TDMA schedule 126 and the HF TDMA schedule 128. These two schedules may overlap in time because the LF transmissions do not interfere with the HF transmissions and vice-versa. It is convenient to synchronize the intervals of both LF and HF TDMA schedules to the same sync pulse 130 from the receiver 76 and 124.

Beginning at the synch pulse 130, a single LF TDMA epoch is divided equally into nine zone intervals exemplified by the zone interval 132. Each zone interval is subdivided into six loop antenna intervals, exemplified by the loop antenna interval 134. Each loop antenna in the region of nine instrumented zones fires in a 54-pulse sequence (18.5 msec pulses, for example) over the epoch of, for example, one second. The inventors believe that this one-second epoch interval may be reduced by up to a factor of 8 depending on the damping characteristics of the particular loop antenna and transmitter embodiments selected for the system. Each loop antenna current pulse, exemplified by the pulse 136, generates a magnetic field that is sensed and measured at every player unit in the instrumented zone. With each loop antenna pulse, three orthogonal player position data are stored in the player unit and broadcast to the nearest instrumented zone microcontroller at the next appropriate HF TDMA interval.

Beginning at the synch pulse 138 (which may be coincident with synch pulse 130, for example), a single HF TDMA epoch is divided equally into nine zone intervals exemplified by the zone interval 140. Each zone interval is subdivided into 16 player broadcast intervals, exemplified by the player broadcast interval 142. The first of the 16 player broadcast intervals is reserved as a player unit request (PUR) interval for use by new player units to request a player reporting interval assignment. The remaining 15 player broadcast intervals are sufficient to handle up to 15 player units within a single instrumented zone.

Figure 10:
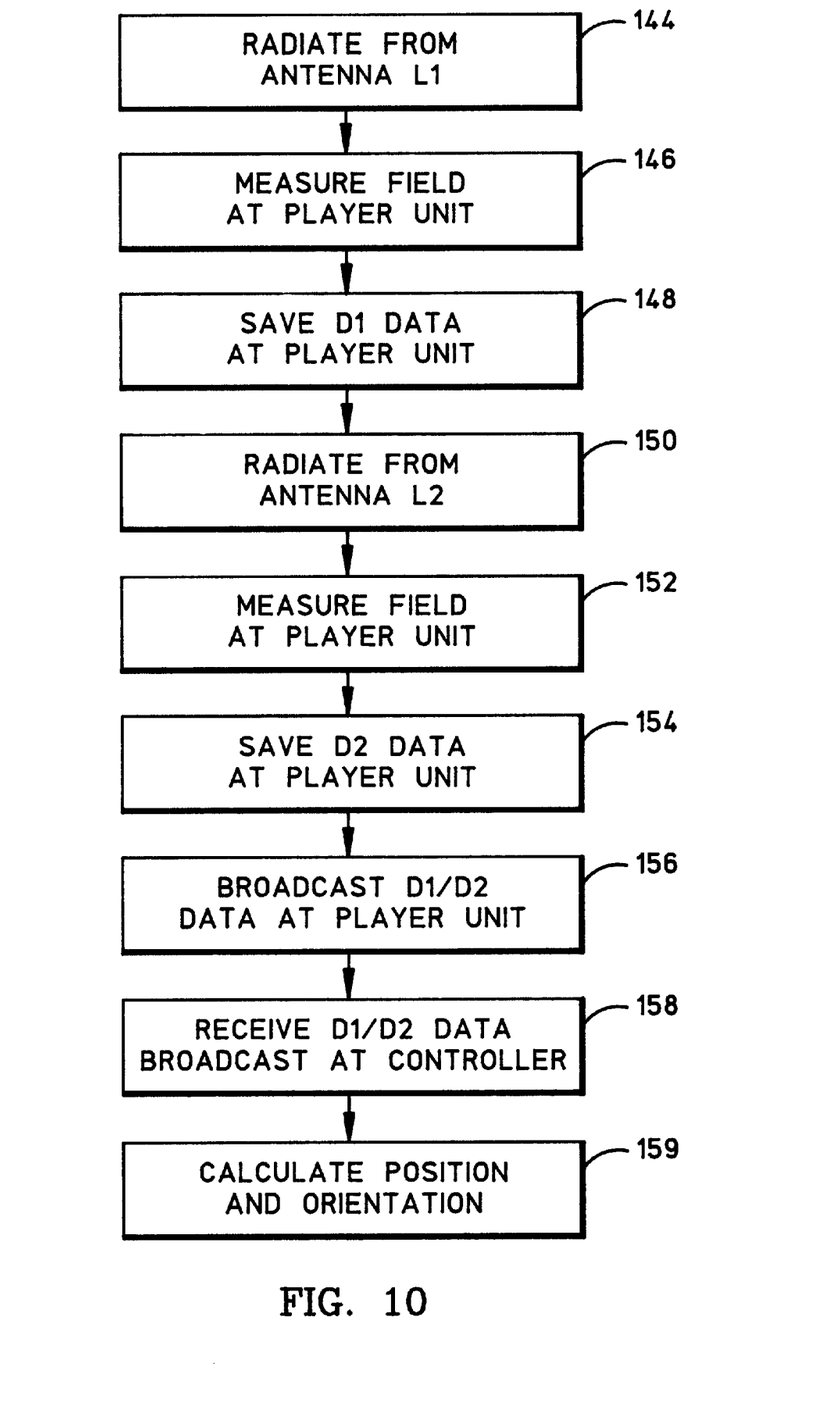
FIG. 10 is a block diagram of a flow chart illustrating the position monitoring method of this invention.

FIG. 10 is a block diagram of a flow chart illustrating the position monitoring method of this invention. Considering a single pair of loop antennas L1/L2, the position location method starts at step 144 with the scheduled current pulse in loop antenna L1. At the next step 146, the player unit receives the L1 magnetic signal and produces a sensor signal S1 representing the L1 magnetic field amplitude. At the step 148, player position data D1 representing sensor signal S1 are stored at the player unit. In the next step 150, the scheduled current pulse is generated in loop antenna L2. At step 152, the player unit receives the L2 magnetic signal and produces a sensor signal S2 representing the L2 magnetic field amplitude. At the step 154, player position data D2 representing sensor signal S2 are stored at the player unit. In the next step 156, a player position data signal representing the player position data D1 and D2 is broadcast by the player unit. In the final step 158, the player position data signal is received at a controller, and the player position is then calculated.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A position locator system including a plurality of instrumented zones, the system comprising:
 a plurality of antennas each having an orientation axis and a predetermined location on the periphery of at least one of the instrumented zones;
 a transmitter coupled to each antenna for producing therein a signal current, whereby a magnetic signal is radiated therefrom; and
 one or more player units each having
 a field sensor for producing a sensor signal representing the magnetic signals radiating from the antennas, and
 a signal processor for generating player position data responsive to the sensor signal representing player location within the position locator system.

2. The system of claim 1 further comprising:
 a controller for receiving player position data broadcasts; and
 in each player unit,
 a data transmitter for broadcasting player position data.

3. The system of claim 2 further comprising:
 a time-division multiple access (TDMA) scheduler for scheduling the data transmitter broadcasts from a plurality of player units to avoid simultaneous broadcasts from any two player units.

4. The system of claim 3 wherein:
 each instrumented zone is generally bounded by three pairs of opposing antennas, wherein the orientation axis of one antenna in each pair is disposed generally parallel to the orientation axis of the opposite antenna in the same pair and generally orthogonal to the orientation axes of the antennas in the other two pairs.

5. The system of claim 4 further comprising:
 a TDMA scheduler for scheduling the signal currents to avoid simultaneous magnetic signal radiation from any two antennas in the same instrumented zone.

6. The system of claim 5 further comprising:
 in the field sensor, three mutually-orthogonal field sensor elements for producing a sensor signal representing the orientation axis of the magnetic signals radiating from the antennas.

7. The system of claim 5 wherein the instrumented zones are disposed within a plurality of regions, each encompassing a plurality of instrumented zones, the system further comprising:
 a TDMA scheduler for scheduling the signal currents to avoid the simultaneous magnetic signal radiation from any two antennas in the same region of instrumented zones.

8. The system of claim 1 further comprising:
 each instrumented zone is generally bounded by three pairs of opposing antennas, wherein the orientation axis of one antenna in each pair is generally parallel to the orientation axis of the opposite antenna in the same pair and generally orthogonal to the orientation axes of the antennas in the other two pairs.

9. The system of claim 1 further comprising:
 a time-division multiple access (TDMA) scheduler for scheduling the signal currents to avoid simultaneous magnetic signal radiation from any two antennas in the same instrumented zone.

10. The system of claim 1 wherein the instrumented zones are disposed within a plurality of regions, each encompassing a plurality of instrumented zones, the system further comprising:
 a time-division multiple access (TDMA) scheduler for scheduling the signal currents to avoid the simultaneous magnetic signal radiation from any two antennas in the same region of the instrumented zones.

11. The system of claim 1 further comprising:
 in the field sensor, three mutually-orthogonal field sensor elements for producing a sensor signal representing the orientation axis of the magnetic signals radiating from the antennas.

12. A method for reporting the position of a player unit in a position locator system including a controller and a plurality of instrumented zones each bounded by two antennas on two generally opposite sides, the method comprising the unordered steps of:

(a.1) radiating a first magnetic signal from the antenna on a first side of a first instrumented zone;

(a.2) receiving the first magnetic signal at the player unit;

(a.3) generating a first sensor signal representing the first magnetic signal received at the player unit;

(b.1) radiating a second magnetic signal from the antenna on a second side of the first instrumented zone generally opposite the first side thereof;

(b.2) receiving the second magnetic signal at the player unit;

(b.3) generating a second sensor signal representing the second magnetic signal received at the player unit;

(c.1) broadcasting a player position data signal corresponding to a combination of all of the sensor signals representing player location within the position locator system; and (c.2) receiving the player position data signal at the controller.

13. The method of claim 12 wherein the first instrumented zone is bounded by four antennas disposed on two orthogonal pairs of generally opposite sides; further comprising the unordered steps of:

(a.4) radiating a third magnetic signal from the antenna on a third side of the first instrumented zone that is disposed generally orthogonal to the first side thereof, (a.5) receiving the third magnetic signal at the player unit;

(a.6) generating a third sensor signal representing the third magnetic signal received at (the player unit;

(b.4) radiating a fourth magnetic signal from the antenna on a fourth side of the first instrumented zone generally opposite the third side thereof, (b.5) receiving the fourth magnetic signal at the player unit; and (b.6) generating a fourth sensor signal representing the fourth magnetic signal received at the player unit.

14. The method of claim 13 wherein the first instrumented zone is bounded by six antennas disposed on three orthogonal pairs of generally opposite sides; further comprising the unordered steps of:

(a.7) radiating a fifth magnetic signal from the antenna on a fifth side of the first instrumented zone that is disposed generally orthogonal to the first and third sides thereof;

(a.8) receiving the fifth magnetic signal at the player unit;

(a.9) generating a fifth sensor signal representing the fifth magnetic signal received at the player unit;

(b.7) radiating a sixth magnetic signal from the antenna on a sixth side of the first instrumented zone generally opposite the fifth side thereof;

(b.8) receiving the sixth magnetic signal at the player unit; and (b.9) generating a sixth sensor signal representing the sixth magnetic signal received at the player unit.

15. The method of claim 14 wherein the player position data signal broadcasts from a plurality of player units are scheduled to avoid simultaneous broadcasts from any two player units.

16. The method of claim 15 wherein the magnetic signals radiated from a plurality of antennas are scheduled to avoid simultaneous magnetic signal radiation from any two antennas in the same instrumented zone.

17. The method of claim 12 wherein the first instrumented zone is bounded by six antennas disposed on three orthogonal pairs of generally opposite sides; further comprising the unordered steps of:

(a.7) radiating a fifth magnetic signal from the antenna on a fifth side of the first instrumented zone that is disposed generally orthogonal to the first and third sides thereof;

(a.8) receiving the fifth magnetic signal at the player unit;

(a.9) generating a fifth sensor signal representing the fifth magnetic signal received at the player unit;

(b.7) radiating a sixth magnetic signal from the antenna on a sixth side of the first instrumented zone generally opposite the fifth side thereof;

(b.8) receiving the sixth magnetic signal at the player unit;

(b.9) generating a sixth sensor signal representing the sixth magnetic signal received at the player unit.

18. The method of claim 12 wherein the player position data signal broadcasts from a plurality of player units are scheduled to avoid simultaneous broadcasts from any two player units.

19. The method of claim 12 wherein the magnetic signals radiated from a plurality of antennas are scheduling to avoid simultaneous magnetic signal radiation from any two antennas in the same instrumented zone.

* * * * *